(12) United States Patent
Garcia Azorero et al.

(10) Patent No.: US 12,127,107 B2
(45) Date of Patent: Oct. 22, 2024

(54) METHOD AND APPARATUS FOR HANDLING BACKGROUND DATA TRANSFER

(71) Applicant: Telefonaktiebolaget LM Ericsson (PUBL), Stockholm (SE)

(72) Inventors: Fuencisla Garcia Azorero, Madrid (ES); Wenliang Xu, Shanghai (CN); Susana Fernandez Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 296 days.

(21) Appl. No.: 17/637,976

(22) PCT Filed: Sep. 9, 2019

(86) PCT No.: PCT/CN2019/104889
§ 371 (c)(1),
(2) Date: Feb. 24, 2022

(87) PCT Pub. No.: WO2021/046676
PCT Pub. Date: Mar. 18, 2021

(65) Prior Publication Data
US 2022/0279431 A1 Sep. 1, 2022

(51) Int. Cl.
*H04W 48/18* (2009.01)
*H04W 4/24* (2018.01)
(Continued)

(52) U.S. Cl.
CPC ............ *H04W 48/18* (2013.01); *H04W 4/24* (2013.01); *H04W 28/0268* (2013.01); *H04W 80/08* (2013.01)

(58) Field of Classification Search
CPC ............ H04M 15/66; H04M 15/8083; H04M 15/8016; H04M 15/41; H04M 15/00; H04L 12/1407; H04L 47/2491
(Continued)

(56) References Cited

U.S. PATENT DOCUMENTS

2020/0029249 A1* 1/2020 Livanos .................. H04W 8/02

FOREIGN PATENT DOCUMENTS

| CN | 104105059 A | 10/2014 |
|---|---|---|
| CN | 107343294 A | 11/2017 |
| WO | 2019032968 A1 | 2/2019 |

OTHER PUBLICATIONS

3GPP TSG-SA2 Meeting #134; Sapporo, Japan, Jun. 24-28, 2019; Change Request; 23.503 CR 0303 rev 1 Current version: 16.1.0; Title: xBDT negotiation and BDT policy retrieval (S2-1908011).
(Continued)

*Primary Examiner* — Huy C Ho
(74) *Attorney, Agent, or Firm* — Weisberg I.P. Law, P.A.

(57) ABSTRACT

The present application generally relates to wireless communication technology. More particularly, the present application relates to a method and an for handling Background Data Transfer (BDT) for a User Equipment (UE). The present application also relates to computer program product adapted for the same purpose. According to one embodiment, a method for handling Background Data Transfer (BDT) for a User Equipment (UE) comprises: a) transmitting, from a node for Application Function (AF) to a node for Policy Control Function (PCF), a policy request indicating the BDT is UE trajectory-relevant; and b) at the node for AF, receiving from the node for PCF, a plurality of BDT policy groups, each of which is associated with a corresponding section of a trajectory.

23 Claims, 6 Drawing Sheets

(51) Int. Cl.
*H04W 28/02* (2009.01)
*H04W 80/08* (2009.01)

(58) Field of Classification Search
USPC .......................................................... 370/329
See application file for complete search history.

(56) References Cited

OTHER PUBLICATIONS

3GPP TR 23.791 v1.1.0 (2018-10) 3rd Generation Partnership Project; Technical Specification Group Services and System Aspects; Study of Enablers for Network Automation for 5G (Release 16).
Epo Communication issued for Application No. 19 944 712.9—1213—Aug. 28, 2023.
3GPP TS 23.501 v16.0.2; 3rd Generation Partnership Project; Technical Specification Group Services and System Aspects; System Architecture for the 5G System; Stage 2 (Release 16)—Apr. 2019.
3GPP TS 23.502 v16.0.2; Technical Specification; 3rd Generation Partnership Project; Technical Specification Group Services and System Aspects; Procedures for the 5G System; Stage 2 (Release 16)—Apr. 2019.
3GPP TS 23.503 v16.0.0; Technical Specification; 3rd Generation Partnership Project; Technical Specification Group Services and System Aspects; Policy and Charging Control Framework for the 5G System; Stage 2 (Release 16)—Mar. 2019.
3GPP TS 29.513 v15.3.0; Technical Specification; 3rd Generation Partnership Project; Technical Specification Group Core Network and Terminals; 5G System; Policy and Charging Control signalling flows and QoS parameter mapping; Stage 3 (Release 15)—Mar. 2019.
SA WG2 Meeting #128bis; Sophia Antipolis, France; Source: Huawei, HiSilicon, Ericsson, KDDI, Convida Wireless; Title: Solution for Key Issue 7: NWDAF assisting Future Background Data Transfer (S2-189050)—Aug. 20-24, 2018.
SA WG2 Meeting #129; Dongguan, China; Source: Huawei, HiSilicon; Title: Updates Solution 18 for Key Issue 7: NWDAF assisting Future Background Data Transfer (S2-1810693)—Oct. 15-19, 2018.
PCT International Search Report issued for International application No. PCT/CN2019/104889—May 27, 2020.
PCT Written Opinion of the International Searching Authority issued for International application No. PCT/CN2019/104889—May 27, 2020.

* cited by examiner

40

METHOD AND APPARATUS FOR HANDLING BACKGROUND DATA TRANSFER

PRIORITY

This nonprofessional application is a U.S. National Stage Filing under 35 U.S.C. § 371 of International Patent Application Serial No. PCT/CN2019/104889 filed Sep. 9, 2019 and entitled "METHOD AND APPARATUS FOR HANDLING BACKGROUND DATA TRANSFER" which is hereby incorporated by reference in its entirety.

TECHNICAL FIELD

The present application generally relates to wireless communication technology. More particularly, the present application relates to a method and an apparatus for handling Background Data Transfer (BDT) for a User Equipment (UE). The present application also relates to computer program product adapted for the same purpose.

BACKGROUND

BDT policy handling is a functionality that allows an Applications Function (AF) to transmit/receive a certain volume of background data traffic per UE or for a number of UEs under some requirements, such as a time window for transfer, specific network conditions, and optionally a network area where the transfer occurs. A Policy Control Function (PCF) can derive a BDT policy that adapts to those requirements. The BDT policy typically may define which QoS and charging control policy are employed within a specific time window for a UE. 3GPP has defined BDT policy handling in EPC and has evolved this functionality into 5G networks. See 3GPP TS 23.503 15.5.0, which is incorporated herein by reference in its entirety.

In IoT and V2X scenarios, a UE is usually moving during a BDT process. For example, truck floats need to report petrol consumption in a driving state, or drones need to report traffic information in flying. Thus, it is desirable to develop a solution available for these scenarios.

SUMMARY

One of the objects is to provide methods and apparatus for handling Background Data Transfer (BDT) for a User Equipment (UE), which allows an optimal usage of network resources and an accurate charging model applied to BDT traffic.

According to one embodiment of the present invention, a method for handling Background Data Transfer (BDT) for a User Equipment (UE) comprises:
 a) transmitting, from a node for Application Function (AF) to a node for Policy Control Function (PCF), a BDT policy request indicating the BDT is UE trajectory-relevant; and
 b) at the node for AF, receiving from the node for PCF, a plurality of BDT policy groups, each of which is associated with a corresponding section of a trajectory.

Preferably, the method further comprises:
 c1) at the node for AF, if one of the plurality of BDT policy groups includes one available BDT policy, selecting it as an applied BDT policy for the corresponding section.

Preferably, the method further comprises:
 c2) at the node for AF, if one of the plurality of BDT policy groups includes more than one available BDT policies, selecting one as an applied BDT policy for the corresponding section; and
 d) notifying the BDT applied policy for the corresponding section from the node for AF to the node for PCF.

Preferably, the BDT policy request at least includes an Application Service Provider (ASP) identifier, volume of data to be transferred for the UE, desired time window for data transfer, and the trajectory.

Preferably, the trajectory is one that the UE will follow, and each of the available BDT policy defines a time period and a network area associated with the corresponding section, and QoS/charging conditions applied to the time period or the network area.

Preferably, the BDT policy request at least includes an Application Service Provider (ASP) identifier, volume of data to be transferred for the UE, desired time window for data transfer, and an indicator that the BDT is UE trajectory-relevant.

Preferably, the trajectory is one that is predicted by a node for Network Data Analytics Function (NWDAF), and each of the available BDT policy defines a time period and a network area associated with the corresponding section, and QoS/charging conditions applied to the time period or the network area.

Preferably, at step a), the BDT policy request is transmitted from the node for AF to the node for PCF via a node for Network Exposure Function (NEF), and wherein at step b) the plurality of BDT policy groups is received at the node for AF from the node for PCF via the node for NEF.

According to another embodiment, an apparatus for handling Background Data Transfer (BDT) for a User Equipment (UE) comprises: a storage device configured to store a computer program comprising computer instructions; and
 a processor coupled to the storage device and configured to execute the computer instructions to perform the method as described above.

According to another embodiment, a method for handling Background Data Transfer (BDT) for a User Equipment (UE) comprises:
 a) at a node for Policy Control Function (PCF), receiving from a node for Application Function (AF) a BDT policy request indicating the BDT is UE trajectory-relevant;
 b) at the node for PCF, determining a plurality of BDT policy groups at least based on a trajectory associated with the UE, each of which is associated with a corresponding section of the trajectory;
 c) transmitting the plurality of BDT policy groups from the node for PCF to the node for AF.

Preferably, at step b), determining the sequence of BDT policy group is further based on anyone of network policy, existing transfer policies, network area information and load status estimation.

Preferably, each of the plurality of BDT policy groups includes one or more available BDT policies.

Preferably, if one of the plurality of BDT policy groups includes one available BDT policy, the available BDT policy is selected as an applied BDT policy for the corresponding section.

Preferably, the method further comprises:
 d) if one of the plurality of BDT policy groups includes more than one available BDT policies, receiving from the node for AF, an applied BDT policy for the corresponding section which is selected among the available BDT policies by the node for AF; and e) storing the applied BDT policy for the corresponding section at a node for User Data Repository (UDR).

Preferably, each of the available BDT policies defines a time period and a network area associated with the corresponding section, and QoS/charging conditions applied to the time period or the network area.

Preferably, the BDT policy request at least includes an Application Service Provider (ASP) identifier, volume of data to be transferred for the UE, desired time window for data transfer, and the trajectory, and the trajectory is one that the UE will follow.

Preferably, the BDT policy request at least includes an Application Service Provider (ASP) identifier, volume of data to be transferred for the UE, desired time window for data transfer, and an indicator that the BDT is UE trajectory-relevant.

Preferably, the trajectory is predicted by a node for Network Data Analytics Function (NWDAF), and the method further comprises:

prior to step b), obtaining the trajectory from the node for NWDAF.

Preferably, the method further comprises:

f) deriving a Policy and Charging Control (PCC) rule based on the applied BDT policy for the corresponding section of the trajectory.

Preferably, the method further comprises:

g) deriving a UE policy or UE Route Selection Policies (URSP) rule based on the applied BDT policy for the corresponding section of the trajectory.

According to another embodiment, an apparatus for handling Background Data Transfer (BDT) for a User Equipment (UE) comprises: a storage device configured to store a computer program comprising computer instructions; and a processor coupled to the storage device and configured to execute the computer instructions to perform the method as described above.

According to another embodiment, a computer program product for handling Background Data Transfer (BDT) for a User Equipment (UE), the computer program product being embodied in a computer readable storage medium and comprising computer instructions for performing anyone of the methods as described above.

One or more embodiments of the present invention at least have the following advantages:

It minimizes the amount of additional signaling messages for supporting functionality. Particularly, it not only reduces processing resources on CP and UP and complexity of network topology but also simplifies traffic flows and reduces energy consumption in products.

The number of UP nodes in a path for each traffic flow are minimum and thus the resources required by the network are reduced. Moreover, this is achieved without limitation on the deployment, especially without limitation on the evolvement of existing GTP-FW products.

The workload for amending the existing part of 3GPP Technical Specifications, e.g., SA2, SA3, CT, is minimized as the changes are only small additions to the existing specifications for defining new Network Function types and reference points.

BRIEF DESCRIPTION OF THE DRAWINGS

The foregoing and other objects, features, and advantages would be apparent from the following more particular description of preferred embodiments as illustrated in the accompanying drawings in which.

DETAILED DESCRIPTION

Figure 1:
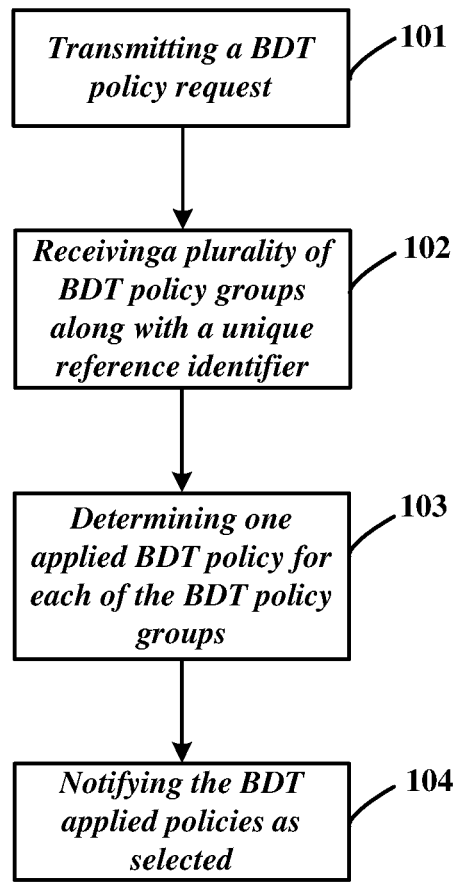
FIG. 1 schematically illustrates a flowchart of the method for handling BDT for a UE according to one embodiment of the present invention.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term "processor" refers to one or more devices, circuits, and/or processing cores configured to process data, such as computer program instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As an illustrative example, in a typical 5G System architecture, a node for Application Function (AF) and a node for Policy Control Function (PCF) may negotiate BDT policies for one or more UEs. The node for AF may initiate a BDT policy negotiation procedure by transmitting to the node for PCF a BDT policy request. As a response, the node for PCF derives or determines the BDT policies and returns them to the node for AF. See 3GPP TS 23.503 15.5.0, which is incorporated herein by reference in its entirety.

Typically, a UE trajectory may be represented in form of a plurality of sections or segments, which one UE will sequentially travel or is expected to sequentially travel. In one or more embodiments of the present invention, a UE trajectory is introduced when determining or deriving a BDT policy for a UE. Specifically, a BDT policy can be tailored for each of the sections, i.e., the BDT policy is section-basis. For example, the BDT policy can designate or define a time period and a network area for BDT which are associated with the corresponding section as well as QoS/charging conditions, e.g., charging rate and maximum aggregated bitrate applicable to the time period or the network area as designated. Since the BDT policy is UE trajectory-relevant, it allows an optimal usage of network resources and an accurate charging model applied to BDT traffic as compared to the prior art where the "temporal granularity" for the BDT policy is larger.

It shall be noted that besides the UE trajectory, one or more other aspects can be under consideration individually or in combination when deriving a BDT policy. The examples of these additional aspects include but are not limited to network policy, existing transfer policies, network area information, load status estimation and level information in a S-NSSAI.

The UE trajectory may be either one that one UE will follow during BDT process or a predicted or expected version. In 3GPP TS 23.501 v16.0.2, Mobility Pattern (MP) is used for characterizing and optimizing UE mobility. Thus, the statistics of the UE mobility can reflect a historical or expected UE moving trajectory. According to 3GPP TS 23.288, the statistics of the UE mobility can be provided by a node for Network Data Analytics Function (NWDAF). Both of the cited technical specifications are incorporated herein by reference in its entirety.

In one or more embodiments of the present invention, to obtain a BDT policy that is UE trajectory-relevant, the node for AF initiates a BDT policy negotiation procedure by transmitting a BDT policy request explicitly or impliedly indicating or asserting this intention.

In one or more embodiments of the present invention, the BDT policy request at least includes an Application Service Provider (ASP) identifier, volume of data to be transferred for a UE, desired time window for data transfer, and a UE trajectory if available. As an example, the UE trajectory may be in form of a list of Tracking Arears (TAs), NG-RAN nodes or cells with trajectory information, e.g., sequencing and timing of the TAs, which is different from a plain list of TAs.

Note that the inclusion of the UE trajectory in the request can be regarded as an implied indication that the BDT is UE trajectory-relevant, and thus an explicit indication may be omitted. Sometimes, however, the UE trajectory is unavailable at the node for AF. In this case, an explicit indication shall be included in the request instead of the UE trajectory.

Optionally, the request may include network area information, which defines either a geographical area (e.g. a civic address or shapes), or an area of interest that includes a plain list of TAs, NG-RAN nodes and/or cell identifiers. With the optional network area information, a common BDT policy can be derived even if the node for PCF lacks capability of handling UE-trajectory BDT policy.

In response to the request from the node for AF, the node for PCF may derive a plurality of BDT policy groups, each of which is applied to one corresponding section of the UE trajectory. As an illustrative example, the corresponding section is associated with a specified network area. The node for PCF may transmit the BDT policy groups as derived, along with a unique reference identifier associated with or allocated to the UE trajectory of the UE, to the node for AF.

In one or more embodiments, to derive a BDT policy for each of the sections of the UE trajectory, the node for PCF may firstly retrieve all existing transfer policies stored in a node for User Data Repository (UDR). Afterwards, the node for PCF may derive or determine one or more available BDT policies from the existing transfer policies for the corresponding section. The determination may be made based on one or more aspects individually or in combination. These aspects include but are not limited to network policy, existing transfer policies, network area information, load status estimation and level information in a S-NSSAI. The node for PCF may be configured to map an ASP identifier into a target DNN and slicing information (i.e. S-NSSAI).

In one ore more embodiments of the present invention, one available BDT policy may consist of a recommended BDT time window for the corresponding section of the UE trajectory, a reference to a charging rate for the recommended BDT time window, and optionally a maximum aggregated bitrate indicating that the charging level according to the referenced charging rate is only applicable to the aggregated traffic of all involved UEs that stay below the referenced charging rate.

In one or more embodiments of the present invention, preferably, the BDT policy groups can be listed in a sequence, the order of which corresponds to that of the sections, whereby impliedly describing the sequence of the PDT policy groups to be applied. Note that each of the BDT policy groups may include either a single available BDT policy or a plurality of available BDT policies. For the case of the single available BDT policy, it is regarded as a default or an applied BDT policy which will be applied when BDT is carried out with a specified time window for the corresponding section. In case where more than one available BDT policies are included in one BDT policy group, the node for AF may select one of the available BDT policies as an applied BDT policy and return the selection to the node for PCF, which in turn, stores the applied BDT policy along with the reference identifier allocated to the UE trajectory of the UE in the node for UDR.

In case where the node for AF fails to provide the UE trajectory in the BDT policy request, the node for PCF may determine the UE trajectory locally or obtain an expected or analytic UE trajectory from other sources, e.g., a node for NWDAF, as the UE trajectory. For example, the node for NWDAF may use the network area information as a hint to filter out from all of the possible UE trajectories an expected one.

Alternatively, in case the node for PCF supports UE trajectory-relevant BDT policy, it may return to the node for AF both of UE trajectory-relevant BDT policies and UE trajectory-irrelevant BDT policies. Optionally, the node for PCF may return a common BDT policy derived based on the network area information if the node for PCF lacks capability of handling UE-trajectory BDT policy.

In one or more embodiments of the present invention, during a BDT procedure for a UE, the node for AF may transmit, to the node for PCF, AF session information along with a reference identifier allocated to a UE trajectory of the UE. Based on the reference identifier, the node for PCF may retrieve from the UDR a sequence of applied BDT policies, each of which will be sequentially applied to the respective section, and derive Policy and Charging Control (PCC) rules according to the applied BDT policies. Afterwards, the node for PCF may monitor the movement of the UE and carry out each of the applied BDT policies when the UE moves into the respective section of the UE trajectory.

Note that sometimes, different nodes participate in negotiating the BDT policies with a node for PCF and transferring background data in cooperation with the node for PCF. In this case, the node for AF participating in the BDT may transmit the unique reference identifier associated with the UE trajectory of the UE, based on which the node for PCF may retrieve from the UDR a sequence of applied BDT policies.

For xBDT scenarios (ongoing work in SA2 which addresses the UE initiated massive traffic, e.g. for uploading collected 3D map data from a car to an application server), the UE trajectory-relevant policy is still applicable. In particular, for example, a URSP policy may include time interval and geographical information and share a common BDT reference ID with a BDT policy. Thus, the URSP policy may be one that is UE trajectory-relevant or section-basis.

For UE controlled xBDT, background data will be transmitted to the UE as part of UE policy including, e.g., the time interval and geographical location at which the UE policy applies. The UE will be responsible for handling MO traffic in accordance with the time interval and location condition in the UE policy.

For network controlled xBDT, the Npcf_UEPolicyControl service may be in charge of updating the UE with the applicable UE Policy per section, based on the time interval and location conditions defined for the corresponding section of the UE trajectory. Moreover, the network (PCF—Npcf_SMPolicyControl) may be responsible for controlling the UE PDU session's QoS/Charging according to the negotiated BDT policy on the section-basis.

A flowchart of a method 100 for handling BDT for a UE according to one embodiment of the present invention is shown in FIG. 1.

The flowchart as shown in FIG. 1 comprises the following steps performed at AF side:

Step 101: The node for AF transmits a BDT policy request to a node for PCF, e.g., via a node for Network Exposure Function (NEF). In an illustrative example, the request may include an Application Service Provider (ASP) identifier, volume of data to be transferred for the UE, desired time window for data transfer, and an indicator indicating the BDT is UE trajectory-relevant. The request may also include a UE trajectory of the UE if available. For example, the UE trajectory may be in form of a list of TAs with trajectory information, e.g., TA sequencing and timing. Preferably, the request may further include network area information, e.g., in form of a plain list of TAs, with which a common BDT policy can be derived even if the node for PCF lacks capability of handling UE-trajectory BDT policy. Moreover, as described above, in case where the node for AF fails to provide the UE trajectory in the BDT policy request, the node for NWDAF may use the network area information to derive an expected UE trajectory. After step 101, the flowchart proceeds to step 102.

Step 102: The node for AF receives, from the node for PCF e.g. via the node for NEF, a plurality of BDT policy groups along with a unique reference identifier associated with or allocated to the UE trajectory of the UE. In the present embodiment, each of the BDT policy groups is associated with a corresponding section of the UE trajectory and may include one ore more available BDT policies. Each available BDT policy defines a time period and a network area associated with the corresponding section, and QoS/charging conditions applied to the time period or the network area.

Step 103: The node for AF determines one applied BDT policy for each of the BDT policy groups. Specifically, if one BDT policy group includes only a single available BDT policy, this available BDT policy is designated as a default or an applied BDT policy which will be applied when BDT is carried out for the BDT policy group or the corresponding section. For one BDT policy group including more than one available BDT policies, the node for AF selects one as an applied BDT policy. After step 103, the flowchart proceeds to step 104.

Step 104: Optionally, for multiple available BDT policies in one BDT policy group, the node for AF notifies the node for PCF of the BDT applied policies as selected, e.g. via the node for NEF.

Figure 2:
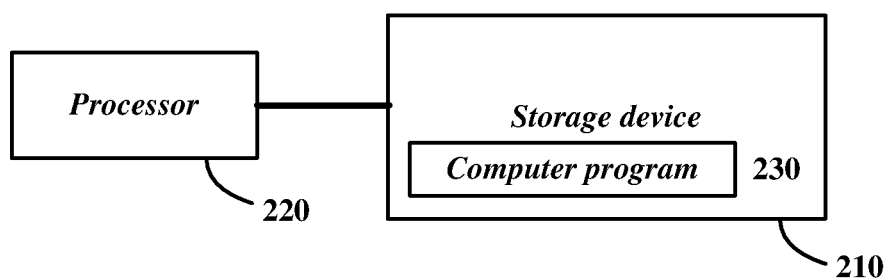
FIG. 2 is a block diagram illustrating an apparatus for handling BDT for a UE according to another embodiment of the present invention.

FIG. 2 is a block diagram illustrating an apparatus for handling BDT for a UE according to another embodiment of the present invention.

With reference to FIG. 2, an apparatus 20 comprises a storage device 210 and a processor 220 coupled to the storage device 210. The storage device 210 is configured to store a computer program 230 comprising computer instructions. The processor 220 is configured to execute the computer instructions to perform some or all of the method steps as shown in FIG. 1. In this embodiment, the apparatus 20 may be a node for AF.

Figure 3:
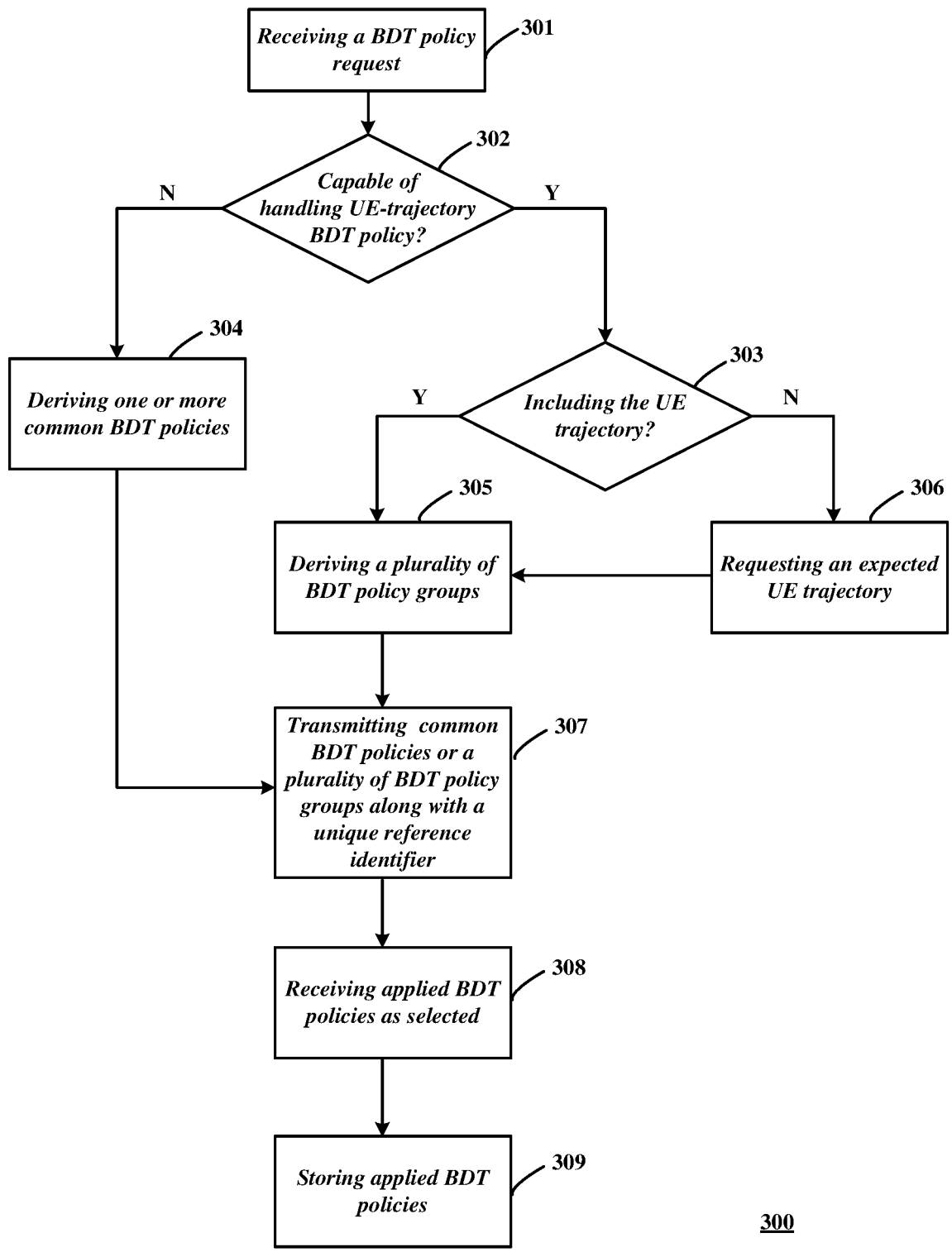
FIG. 3 schematically illustrates a flowchart of the method for handling BDT for a UE according to another embodiment of the present invention.

A flowchart of a method 300 for handling BDT for a UE according to one embodiment of the present invention is shown in FIG. 3.

The flowchart as shown in FIG. 3 comprises the following steps performed at PCF side:

Step 301: The node for PCF receives, from a node for AF e.g., via a node for Network Exposure Function (NEF), a BDT policy request indicating the BDT for a UE is UE trajectory-relevant.

In an illustrative example, the request may include an Application Service Provider (ASP) identifier, volume of data to be transferred for the UE, desired time window for data transfer, an indicator indicating the BDT is UE trajectory-relevant, and UE trajectory of the UE if available.

Step 302: The node for PCF determines whether it is capable of handling UE-trajectory BDT policy. If having such capability, the flowchart proceeds to step 303; otherwise, the flowchart proceeds to step 304.

Step 303: The node for PCF determines whether the BDT policy request includes the UE trajectory. If it is the case, the flowchart proceeds to step 305; otherwise, the flowchart proceeds to step 306.

Step 304: The node for PCF derives one or more common BDT policies without considering the UE trajectory. For example, the common BDT policies may rely on the following aspects individually or in combination: network policy, level information in a S-NSSAI and load status estimation for the required time window, network area information, and existing transfer policies. After step 304, the flowchart proceeds to step 307.

Step 305: The node for PCF derive a plurality of BDT policy groups, each of which is applied to one corresponding section of the UE trajectory. For example, to derive a BDT policy for each of the sections of the UE trajectory, the node for PCF may derive or determine one or more available BDT policies in the respective BDT policy group. The determination may be made based on, e.g., existing transfer policies, network area information, load status estimation and level information in a S-NSSAI. After step 305, the flowchart proceeds to step 307.

Step 306: The node for PCF may request the node for NWDAF to provide an expected UE trajectory. After step 306, the flowchart proceeds to step 305 where the expected UE trajectory is used for deriving available BDT policies.

Step 307: The node for PCF transmits to the node for AF, e.g. via the NEF, one or more common BDT policies as derived at step 304 or a plurality policy groups as derived at step 305. After step 307, the flowchart proceeds to step 308.

Step 308: In this embodiment, for those BDT policy group including more than one available BDT policies, the node for AF selects one as an applied BDT policy for the respective BDT policy group. Likewise, for multiple common BDT policies, the node for AF selects one as an applied BDT policy. At this step, the node for PCF receives from the node for AF the applied BDT policies as selected. After step 308, the flowchart proceeds to step 309.

Step: 309: The node for PCF stores the common BDT policy or the applied BDT policies of all of the BDT policy groups at a node for User Data Repository (UDR).

Figure 4:
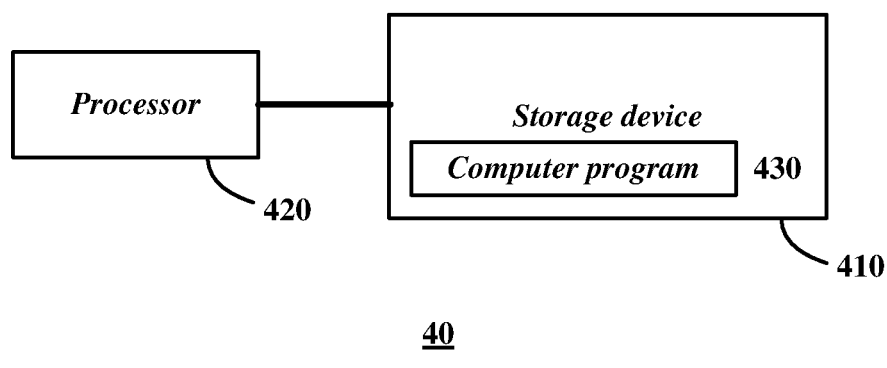
FIG. 4 is a block diagram illustrating an apparatus for handling BDT for a UE according to another embodiment of the present invention.

FIG. 4 is a block diagram illustrating an apparatus for handling BDT for a UE according to another embodiment of the present invention.

With reference to FIG. 4, an apparatus 40 comprises a storage device 410 and a processor 420 coupled to the storage device 410. The storage device 410 is configured to store a computer program 430 comprising computer instructions. The processor 420 is configured to execute the computer instructions to perform some or all of the method steps as shown in FIG. 3. In this embodiment, the apparatus 40 may be a node for PCF.

As described above, a node for Application Function (AF) and a node for Policy Control Function (PCF) may negotiate BDT policies for one or more UEs. In an illustrative example, the negotiation can be achieved by modifying a negotiation procedure for BDT as defined in 3GPP TS 23.503 15.5.0, which is incorporated herein by reference in its entirety.

Figure 5:
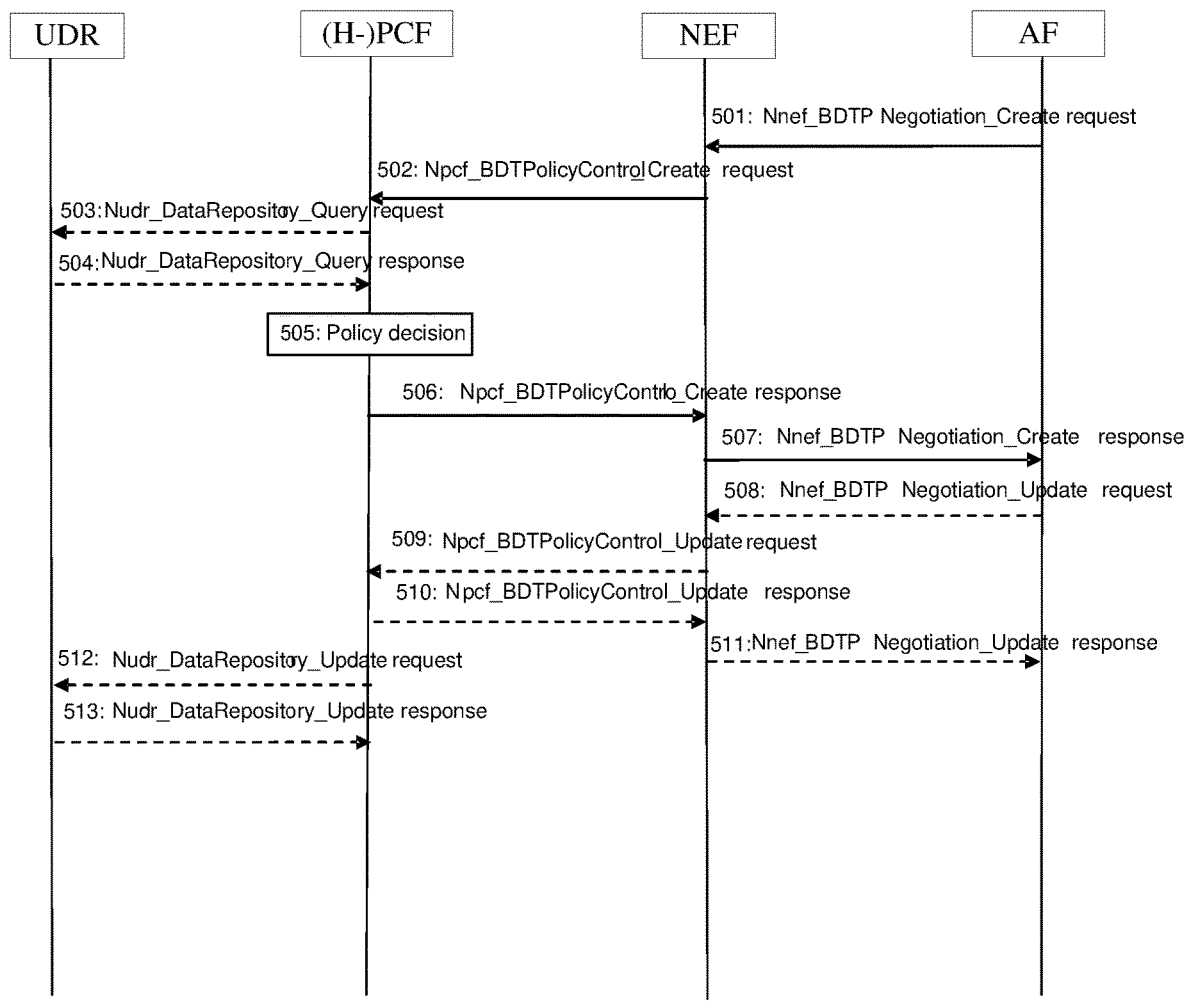
FIG. 5 schematically illustrates a modified negotiation procedure according to another embodiment of the present invention.

FIG. 5 schematically illustrates a modified negotiation procedure according to another embodiment of the present invention.

As shown in FIG. 5, the procedure comprises the following steps:

Step 501: The AF invokes a Nnef_BDTPNegotiation_Create service operation by sending an Nnef_BDTPNegotiation_Create request to the resource "BDT Subscription" to get BDT policies. The request shall contain an ASP identifier, the volume of data to be transferred per UE, the expected amount of UEs, the desired time window and optionally, network area information either as a geographical area (e.g. a civic address or shapes), or an area of interest that includes a list of TAs and/or list of NG-RAN nodes and/or a list of cell identifiers. When the AF provides a geographical area, then the NEF maps it based on local configuration into a short list of TAs and/or NG-RAN nodes and/or cells identifiers that is provided to the (H-)PCF. When the AF requires UE trajectory-relevant BDT policies, the AF will indicate this intention in the Nnef_BDTPNegotiation_Create request. If available, the AF will also provide the UE trajectory in the request.

Furthermore, since the AF does not know if the PCF supports the handling of UE trajectory, preferably, it may also provide the network area information.

Step 502: Upon receipt of the Nnef_BDTPNegotiation_Create request from the AF, the NEF invokes the Npcf_BDTPolicyControl_Create service operation with the (H-)PCF by sending an Npcf_BDTPolicyControl_Create request to the resource "BDT policies". The request operation includes the ASP identifier, the volume of data to be transferred per UE, the expected number of UEs, the desired time window, and optionally the network area information (list of TAs and/or NG-RAN nodes and/or cells identifiers). If the Nnef_BDTPNegotiation_Create request received at the NEF includes an indicator that BDT policies are UE trajectory-relevant and the UE trajectory, the NEF will transmit the UE trajectory to the (H-)PCF.

Step 503: The (H-) PCF may invoke the Nudr_DataRepository_Query service operation by sending an Nudr_DataRepository_Query request to the resource "BdtData", to request from the UDR all stored transfer policies.

Step 504: The UDR sends an HTTP "200 OK" response to the (H-) PCF.

Note that in case only one PCF is deployed in the network, transfer policies can be locally stored in the PCF and the interaction with the UDR is not required.

Step 505: The (H-) PCF determines one or more BDT policies based on the information received from the NEF and other available information (e.g. network policy, existing transfer policies, network area information and load status estimation for the desired time window). If the UE trajectory was received and the (H-)PCF supports this functionality, the (H-)PCF may derive BDT policies per trajectory section having respective QoS and charging demands. That is, the (H-)PCF may derive a plurality of BDT policy groups for the UE trajectory, each of which is applicable to one corresponding section. Sometimes, the AF may have no knowledge of the UE trajectory. In this situation, if the AF indicated that the BDT policies could be UE trajectory-relevant and the PCF supports this functionality, the (H-)PCF may send the ASP identifier and the network area information if available to an NWDAF, which derives an expected or analytic UE trajectory and returns it to the (H-)PCF. Therefore, the (H-)PCF determines the BDT policies for the sections of the expected or analytic UE trajectory. Furthermore, if the (H-)PCF does not support the functionality, current procedures as defined in 3GPP TS are applied.

Step 506: The (H-) PCF invokes an Npcf_BDTPolicyControl_Create service operation by transmitting the BDT policy groups as derived along with a BDT Reference ID associated with the UE trajectory of the UE. If more than one available BDT policies is included in one BDT policy group, an indicator may be accompanied with the BDT policy group, indicating multiple transfer policies for the corresponding section. Moreover, the PCF may transmit UE trajectory-irrelevant BDT policies.

Step 507: The NEF sends an Nnef_BDPNegotiation_Create response to forward the received BDT policy Groups to the AF.

Note that if more than one available BDT policies are derived for one or more sections of the UE trajectory, the AF will select one applied BDT policy for the corresponding section. In this situation, steps 8-11 are executed. Otherwise, the flow proceeds to step 12.

Step 508: The AF invokes the Nnef_BDTPNegotiation_Update service operation by sending an HTTP PATCH request to the resource "Individual BDT Subscription" to provide the NEF with the applied BDT policy as selected.

Step 509: The NEF invokes the Npcf_BDTPolicyControl_Update service operation by sending an HTTP PATCH request to the resource "Individual BDT policy" to provide the (H-)-PCF with the selected applied BDT policies.

Step 510: The (H-) PCF sends an HTTP PATCH response message to the NEF.

Step 511: The NEF sends an HTTP PATCH response message to the AF.

Step 512: If the applied BDT polices are not locally stored at the (H-)PCF, the (H-)PCF invokes the Nudr_DataRepository_Update service operation by sending an HTTP PUT request to the resource "IndividualBdtData" to store the applied BDT polices along with the associated BDT reference ID, the volume of data per UE, the expected number of UEs and the corresponding network area information if available in the UDR.

Step 513: The UDR sends an HTTP "201 Created" response to the (H-)PCF.

AF Session Establishment may trigger PCF-initiated SM Policy Association Modification procedure as defined in 3GPP TS 29.513, which is incorporated herein by reference in its entirety.

Figure 6:
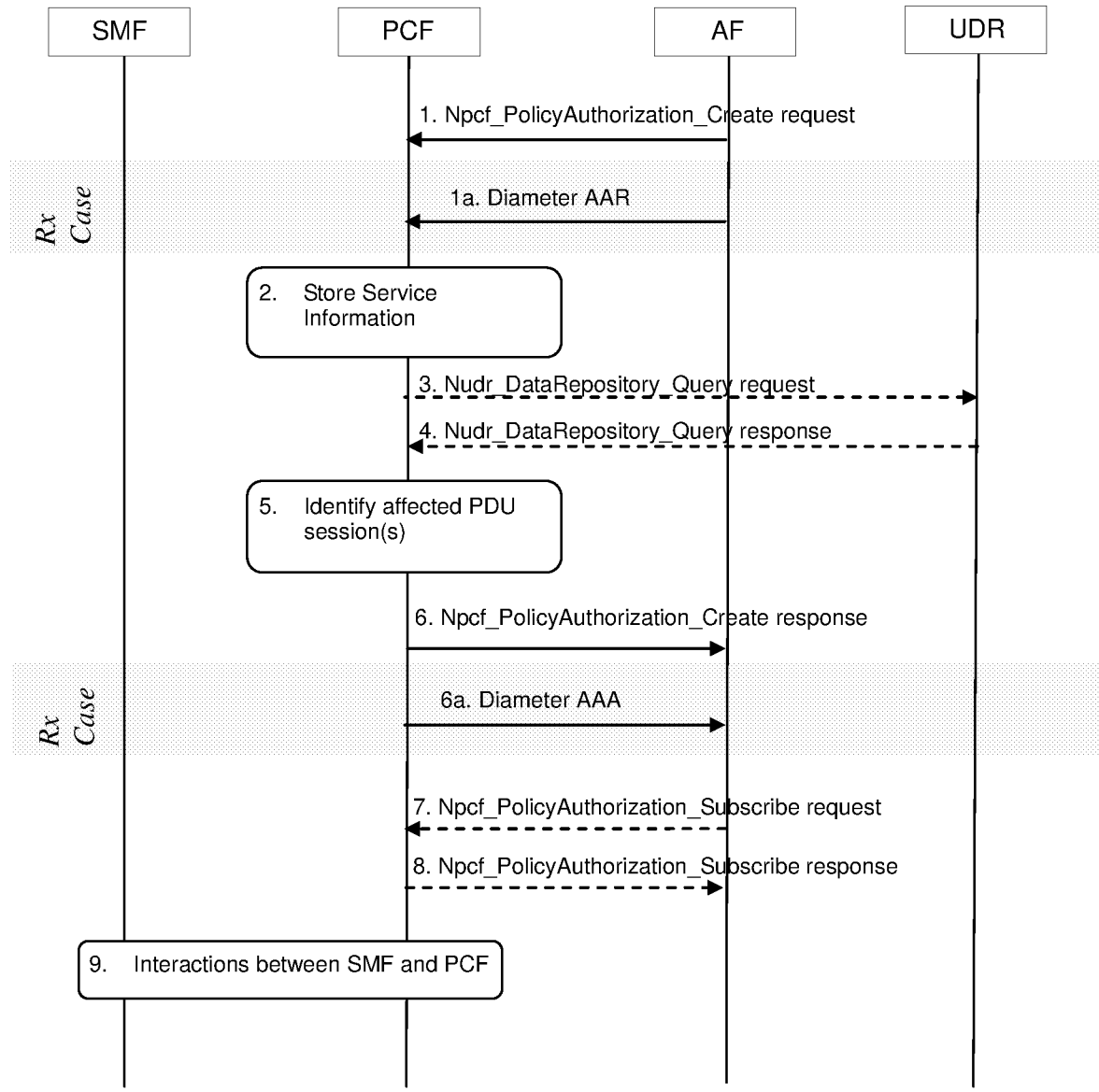
FIG. 6 schematically illustrates a PCF-initiated SM Policy Association Modification procedure.

FIG. 6 schematically illustrates a PCF-initiated SM Policy Association Modification procedure.

As shown in FIG. 6, the procedure comprises the following steps:

Step 1: When the AF receives an internal or external trigger to set-up a new AF session, the AF invokes the Npcf_PolicyAuthorization_Create service operation to the PCF by sending the HTTP POST request to the "Application Sessions" resource. The request operation includes the AF Identifier, the IP address or the MAC address of the UE, the identification of the application session context, the SUPI if available, the GPSI if available, the DNN if available, Media information, bandwidth requirements, sponsored data connectivity if applicable, flow description, AF application identifier, Flow status, Priority indicator, emergency indicator, Application service provider, resource allocation outcome, etc. The request operation may also include the subscription to notifications on certain user plane events, e.g. subscription to QoS notification control.

Step 1*a*: The AF provides the Service Information to the PCF by sending a Diameter AAR for a new Rx Diameter session.

Step 2: The PCF stores the Service Information received in step 1*a*.

Step 3-4: If the PCF does not have the subscription data for the SUPI and DNN, it invokes the Nudr_DataRepository_Query service operation to the UDR by sending the HTTP GET request to the "SessionManagementPolicyData" resource. The UDR sends an HTTP "200 OK" response to the PCF with the subscription data.

Additionally, if the AF provided a Background Data Transfer Reference ID in step 1 or step 1*a* and the corresponding transfer policy is not locally stored in the PCF, the PCF sends the HTTP GET request to the "BdtData" resource. The UDR sends an HTTP "200 OK" response to the PCF with the Background Data Transfer policy.

Step 5: The PCF identifies the affected established PDU Session (s) using the information previously received from the SMF and the Service Information received from the AF.

Step 6: The PCF sends an HTTP "201 Created" response to the AF.

Step 6*a*: The PCF sends a Diameter AAA to the AF.

Step 7: The AF may invoke the Npcf_PolicyAuthorization_Subscribe service operation by sending the HTTP PUT request to the "Events Subscription" resource to subscribe to events in the PCF. The request includes the events that subscribes and a Notification URI to indicate to the PCF where to send the notification of the subscribed events.

Step 8: The PCF sends an HTTP "201 Created" response to the AF.

Step 9: The PCF interacts with SMF. In one embodiment of the present invention, this operation may be performed according to an interactions procedure between SMF, PCF and CHF for PCF-initiated SM Policy Association Modification procedure as shown in FIG. 7.

Figure 7:
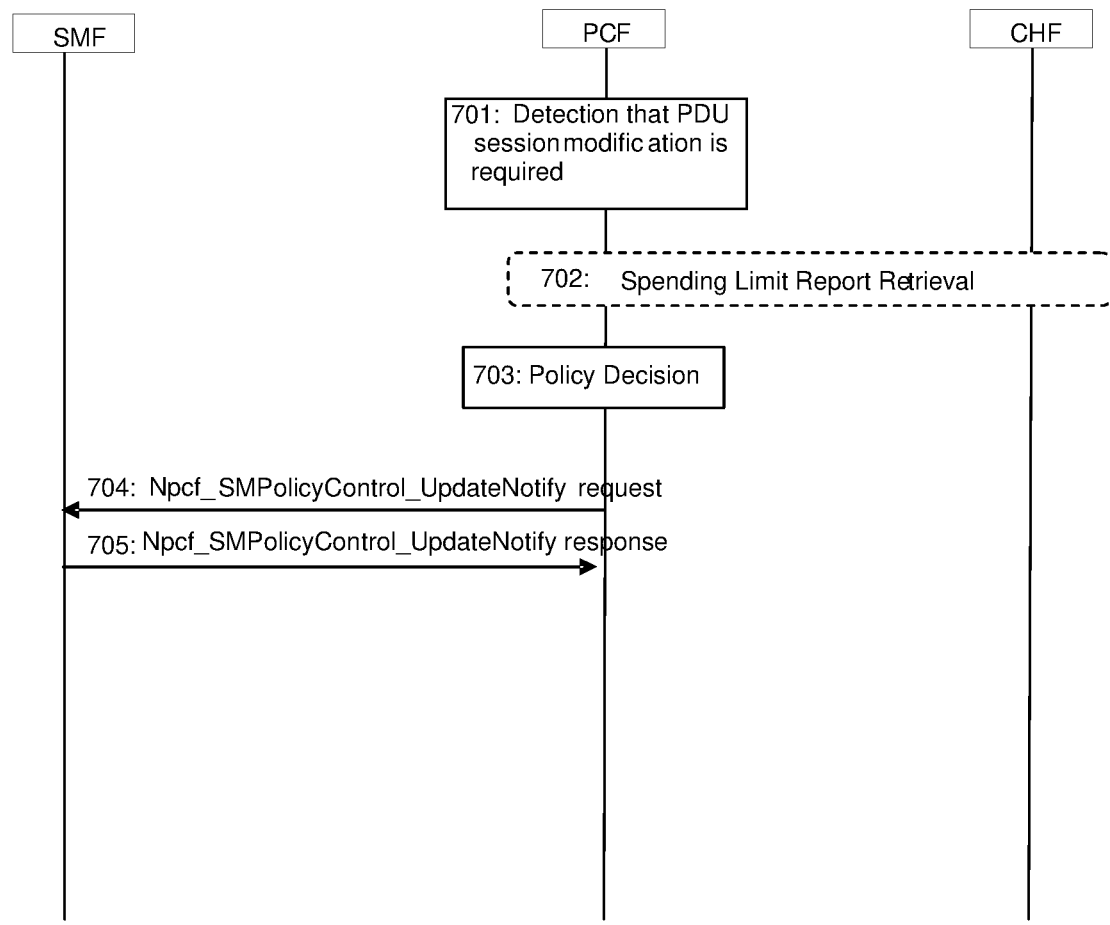
FIG. 7 schematically illustrates an interactions procedure between SMF, PCF and CHF for PCF-initiated SM Policy Association Modification procedure according to another embodiment of the present invention.

As shown in FIG. 7, the procedure comprises the following steps:

Step 701: The PCF receives an internal or external trigger to re-evaluate PCC Rules and policy decision for a PDU Session. For example, possible external trigger events may be ones described in clause 5.2.2.2.2 of 3GPP TS 29.513. In addition, this procedure may be triggered by the following cases:

- The UDR notifies the PCF about a policy subscription change (e.g. change in MPS EPS Priority, MPS Priority Level and/or IMS Signaling Priority, or change in user profile configuration indicating whether supporting application detection and control).
- The CHF provides a Spending Limit Report to the PCF, e.g., as described in sub clause 5.3.5 of 3GPP TS 29.513.

Step 702: If the PCF determines that the policy decision depends on the status of the policy counters available at the CHF and such reporting is not established for the subscriber, the PCF initiates an Initial Spending Limit Report, e.g., as defined in sub clause 5.3.2 of 3GPP TS 29.513. If policy counter status reporting is already established for the subscriber, and the PCF decides to modify the list of subscribed policy counters, the PCF sends an Intermediate Spending Limit Report, e.g., as defined in 3GPP TS 29.513 sub clause 5.3.3. If the PCF decides to unsubscribe any future status notification of policy counters, it sends a Final Spending Limit Report Request to cancel the request for reporting the change of the status of the policy counters available at the CHF, e.g., as defined in sub clause 5.3.4 of 3GPP TS 29.513.

Step 703: The PCF makes a policy decision. The PCF can determine that updated or new policy information need to be sent to the SMF. If the trigger in step 701 was an AF interaction that included a Reference Identity that relates to either one UE trajectory-irrelevant BDT policy or a plurality of UE trajectory-irrelevant policies for the sections of the UE trajectory in a sequence, the PCF will determine, based on the current time and UE location, an appropriate transfer policy to be applied from the sequence and will generate PCC rules accordingly. In addition, the PCF will continue to monitor the time and UE location to determine whether it shall switch to the next transfer policy in the sequence. When this occurs, step 703 will be executed.

Step 704: The PCF invokes the Npcf_SMPolicyControl_UpdateNotify service operation by sending the HTTP POST request with "{Notification URI}/update" as the resource URI to the SMF that has previously subscribed. The request operation provides the PDU session ID and the updated policies, e.g., as described in sub clause 4.2.4 of 3GPP TS 29.512.

Step 705: The SMF sends an HTTP "200 OK" to the PCF.

It should be noted that the aforesaid embodiments are illustrative instead of restricting, substitute embodiments may be designed by those skilled in the art without departing from the scope of the claims enclosed. The wordings such as "include", "including", "comprise" and "comprising" do not exclude elements or steps which are present but not listed in the description and the claims. It also shall be noted that as used herein and in the appended claims, the singular forms "a", "an", and "the" include plural referents unless the context clearly dictates otherwise. Embodiments can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

What is claimed is:

1. A method for handling Background Data Transfer (BDT) for a User Equipment (UE), be characterized in comprising:
    transmitting, from a node for Application Function (AF) to a node for Policy Control Function (PCF), a BDT policy request indicating the BDT is UE trajectory-relevant; and
    at the node for AF, receiving from the node for PCF, a plurality of BDT policy groups, each of which is associated with a corresponding section of a trajectory.

2. The method according to claim 1, further comprising:
    at the node for AF, if one of the plurality of BDT policy groups includes one available BDT policy, selecting it as an applied BDT policy for the corresponding section.

3. The method according to claim 2, wherein the BDT policy request at least includes an Application Service Provider (ASP) identifier, volume of data to be transferred for the UE, desired time window for data transfer, and the trajectory.

4. The method according to claim 3, wherein the trajectory is one that the UE will follow, and each of the available BDT policy defines a time period and a network area associated with the corresponding section, and QoS/charging conditions applied to the time period or the network area.

5. The method according to claim 2, wherein the BDT policy request at least includes an Application Service Provider (ASP) identifier, volume of data to be transferred for the UE, desired time window for data transfer, and an indicator that the BDT is UE trajectory-relevant.

6. The method according to claim 5, wherein the trajectory is one that is predicted by a node for Network Data Analytics Function (NWDAF), and
    each of the available BDT policy defines a time period and a network area associated with the corresponding section, and QoS/charging conditions applied to the time period or the network area.

7. The method according to claim 1, further comprising:
    at the node for AF, if one of the plurality of BDT policy groups includes more than one available BDT policies, selecting one as an applied BDT policy for the corresponding section; and
    notifying the BDT applied policy for the corresponding section from the node for AF to the node for PCF.

8. The method according to claim 1, wherein the BDT policy request is transmitted from the node for AF to the node for PCF via a node for Network Exposure Function (NEF), and wherein the plurality of BDT policy groups is received at the node for AF from the node for PCF via the node for NEF.

9. An apparatus for handling Background Data Transfer (BDT) for a User Equipment (UE), be characterized in comprising:
    a storage device configured to store a computer program comprising computer instructions; and
    a processor coupled to the storage device and configured to execute the computer instructions to perform the method according to claim 1.

10. A computer program product for performing protection control in a core network with separation between control plane and user plane, the computer program product being embodied in a non-transitory computer readable storage medium and comprising computer instructions for performing the method according to claim 1.

11. A method for handling Background Data Transfer (BDT) for a User Equipment (UE), be characterized in comprising:
    at a node for Policy Control Function (PCF), receiving from a node for Application Function (AF) a BDT policy request indicating the BDT is UE trajectory-relevant;
    at the node for PCF, determining a plurality of BDT policy groups at least based on a trajectory associated with the UE, each of which is associated with a corresponding section of the trajectory;
    transmitting the plurality of BDT policy groups from the node for PCF to the node for AF.

12. The method according to claim 11, wherein determining a plurality of BDT policy groups is further based on any one of network policy, existing transfer policies, network area information and load status estimation.

13. The method according to claim 11, wherein each of the plurality of BDT policy groups includes one or more available BDT policies.

14. The method according to claim 13, if one of the plurality of BDT policy groups includes one available BDT policy, the available BDT policy is selected as an applied BDT policy for the corresponding section.

15. The method according to claim 14, further comprising:
    deriving a Policy and Charging Control (PCC) rule based on the applied BDT policy for the corresponding section of the trajectory.

16. The method according to claim 14, further comprising:
    deriving a UE policy or UE Route Selection Policies (URSP) rule based on the applied BDT policy for the corresponding section of the trajectory.

17. The method according to claim 13, further comprising:
    if one of the plurality of BDT policy groups includes more than one available BDT policies, receiving from the node for AF, an applied BDT policy for the corresponding section which is selected among the available BDT policies by the node for AF; and storing the applied BDT policy for the corresponding section at a node for User Data Repository (UDR).

18. The method according to claim 13, wherein each of the available BDT policies defines a time period and a network area associated with the corresponding section, and QoS/charging conditions applied to the time period or the network area.

19. The method according to claim 11, wherein the BDT policy request at least includes an Application Service Provider (ASP) identifier, volume of data to be transferred for the UE, desired time window for data transfer, and the trajectory, and the trajectory is one that the UE will follows.

20. The method according to claim 11, wherein the BDT policy request at least includes an Application Service Provider (ASP) identifier, volume of data to be transferred for the UE, desired time window for data transfer, and an indicator that the BDT is UE trajectory-relevant.

21. The method according to claim 20, wherein the trajectory is predicted by a node for Network Data Analytics Function (NWDAF), and further comprising:

prior to determining a plurality of BDT policy groups, obtaining the trajectory from the node for NWDAF.

22. An apparatus for handling Background Data Transfer (BDT) for a User Equipment (UE), be characterized in comprising:

a storage device configured to store a computer program comprising computer instructions; and a processor coupled to the storage device and configured to execute the computer instructions to perform the method according to claim 11.

23. A computer program product for performing protection control in a core network with separation between control plane and user plane, the computer program product being embodied in a non-transitory computer readable storage medium and comprising computer instructions for performing the method according to claim 11.

* * * * *